Aug. 12, 1952   M. SOLOMON   2,606,555
SURGICAL TUBE, DRAIN, AND VALVE HOLDER
Filed Dec. 31, 1949   3 Sheets-Sheet 1

INVENTOR.
MORRIS SOLOMON
BY James and Franklin
ATTORNEYS

Aug. 12, 1952      M. SOLOMON      2,606,555
SURGICAL TUBE, DRAIN, AND VALVE HOLDER
Filed Dec. 31, 1949      3 Sheets-Sheet 2
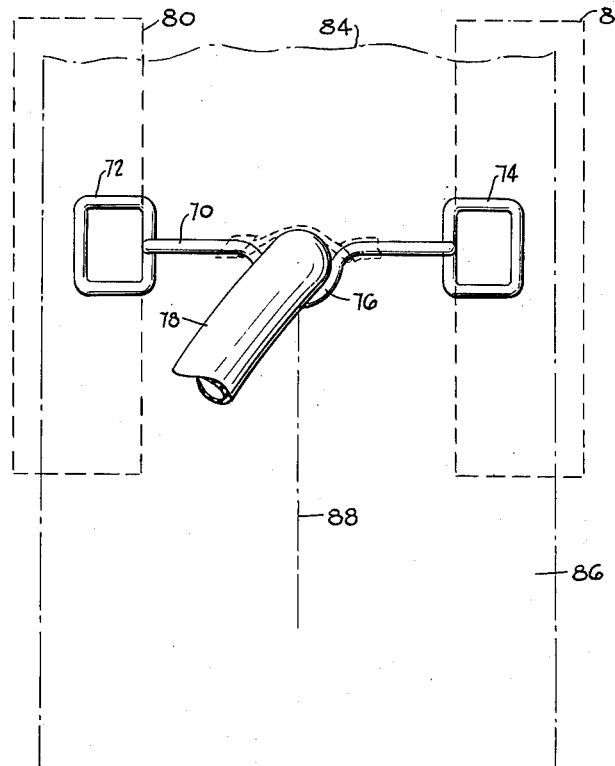
Fig. 6.
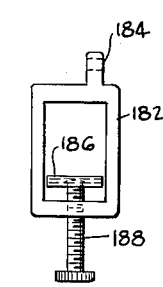
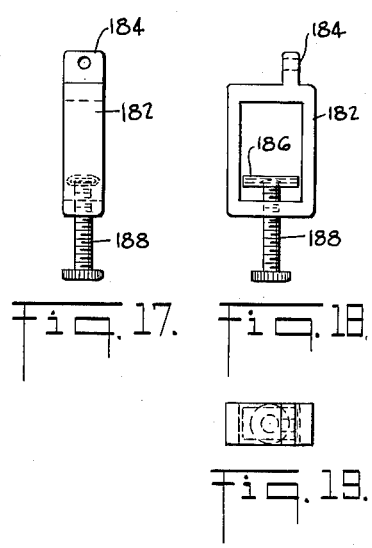
Fig. 17.    Fig. 18.
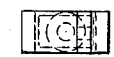
Fig. 19.
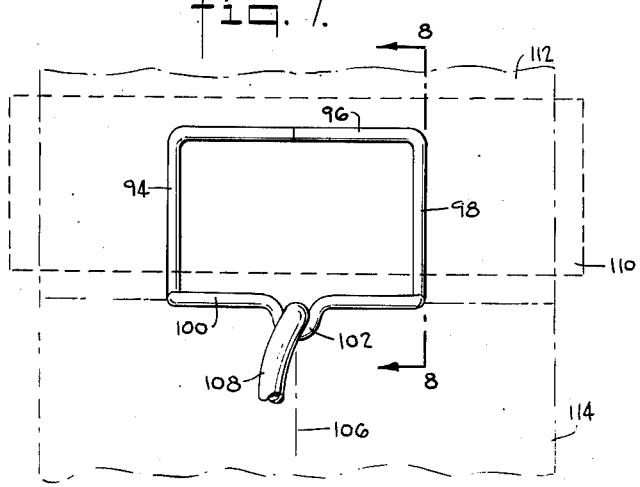
Fig. 7.
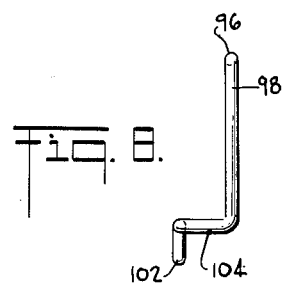
Fig. 8.
INVENTOR.
MORRIS SOLOMON
BY James and Franklin
ATTORNEYS

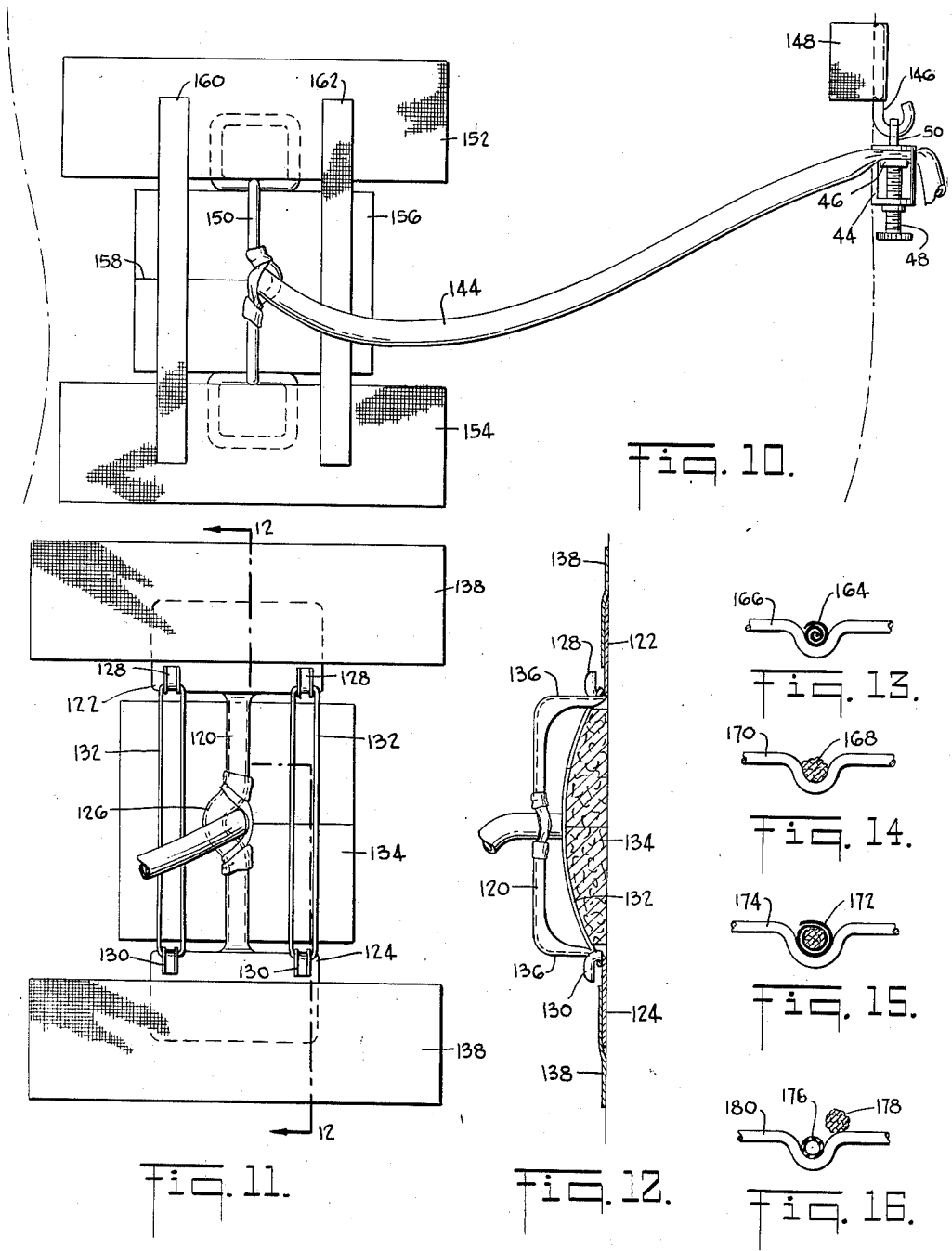

Patented Aug. 12, 1952

2,606,555

UNITED STATES PATENT OFFICE 2,606,555

SURGICAL TUBE, DRAIN, AND VALVE HOLDER

Morris Solomon, New Rochelle, N. Y.

Application December 31, 1949, Serial No. 136,381

18 Claims. (Cl. 128—171)

This invention relates to surgery, and more particularly to a holder for a surgical tube or drain, and for a valve when needed.

There are many surgical procedures in which a rubber tube is left passing into the body as, for example, biliary drainings by means of a T tube or common duct drainage tube. Rubber tubes are used also to establish and maintain drainage in thoracic, genito-urinary, and in gastro-enterologic surgery. In other surgical procedures not requiring a tube, there nevertheless may be left in the incision a rubber dam drain, or a gauze drain, or a combination of the two, that is, a so-called "cigarette drain" in which a rubber dam is wrapped around gauze. A combination of both a tube and a drain may be used immediately after an operation, the drain being removed later as the incision heals, leaving only the tube. In all these cases it is extremely important to positively anchor the tube or/and drain because otherwise it is likely to be either pulled out or pushed or sucked into the body accidentally, and either of these contingencies would be serious and would probably require further operation.

In past procedure a thread has been tied around the rubber tube and secured to a safety pin which is taped to the body. In the case of tubes of larger calibre a safety pin is sometimes pushed through the tube itself and closed, and the pin is then taped against the body, with the disadvantage that the metal of the pin rests directly on the wound. In some types of operations and sizes of drain the drain may be actually sutured to the flesh because of the importance of making sure that the drain is not pulled out of position.

It is necessary to provide an absorbent dressing around the tube at the body opening, and this dressing must be changed frequently. The prevailing practice is to provide large areas of adhesive tape, say two on each side of and quite remote from the incision, and to run cords or "ties" across the body between them. The dressing is quite large, say 4" square or larger, and the cords are tied over the dressing to help hold it in place. The dressing tends to shift due to body motion and the weight of the dressing, together with action of clothing against the same. This in turn may tend to displace the tube.

In cases where control of the flow of the drainage is necessary (as in bile drainage), the free end of the tube is closed by a valve of the screw clamp type in the form of a broad U. These valves are quite large and clumsy, and an additional safety pin and cord are commonly employed to help support the valve. In some cases movement of the valve may tend to move the tube.

The primary object of the present invention is to overcome the foregoing difficulties. A more particular object is to provide a holder which is small, light, inexpensive, and readily secured to the body, and to which a surgical tube or drain may be securely anchored. A further object is to provide such a holder which will facilitate changing the dressing immediately around the tube; which will make possible the use of a small dressing, say 2" square; which will securely hold the dressing in position yet which does not require tearing adhesive tape from the skin of the patient each day when the dressing is changed; and which provides a hook for securely supporting a valve so that there is no danger of the valve tending to dislodge the tube.

Other objects are to provide a holder which may be secured in place on an ambulatory patient by means of tapes which are horizontal so that they do not draw or wrinkle when the patient changes position; which does not interfere with bending or movement of the body; which maintains a uniform spacing or relaxation of the flesh around the tube; and which guards against stresses resulting from bending or bodily activity being transferred to the tube or the incision therearound.

To accomplish the foregoing general objects, and other more specific objects which will hereinafter appear, my invention resides in the valve and holder elements, and their relation one to another as are hereinafter more particularly described in the following specification. The specification is accompanied by drawings in which:

Fig. 6 is a similar view showing a further modification;

Fig. 7 shows still another form of holder embodying the principles of the invention;

Fig. 8 is a side elevation of the holder shown in Fig. 7;

Fig. 10 shows a holder and remote hook applied to the body of a patient;

Fig. 11 is a front elevation of a modified holder;

Fig. 12 is a section taken in the plane of the line 12—12 in Fig. 11;

Figs. 13, 14, 15 and 16 are schematic views indicating the utility of the holder with drains; and Figs. 17, 18, and 19 are edge, front, and top views respectively, to illustrate a modified valve having a plastic body.

Figure 1:
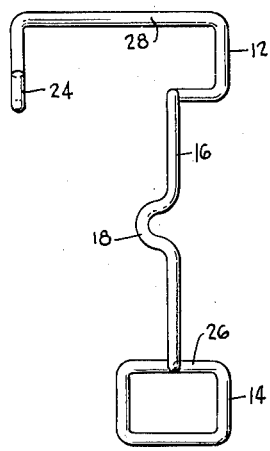
Fig. 1 is a front elevation of a preferred form of holder for a tube and valve.
Figure 2:
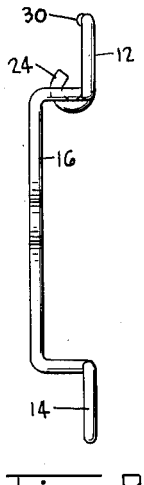
Fig. 2 is a side elevation of the same.

Referring to the drawing, and more particularly to Figs. 1 and 2, the holder there shown comprises two spaced base portions 12 and 14 connected by a raised bridge 16. This has a yoke 18 to receive the tube or drain. The base portions are adapted to be secured against the body by means of adhesive tape, in a manner best shown in Figs. 3 and 4, in which it will be seen that a band 20 of adhesive tape is applied over the upper base 12, and another band 22 of adhesive tape is applied over the lower base 14. The holder is preferably made of a single piece of wire bent to form the bases 12 and 14, the bridge 16, and the yoke 18. The wire is preferably made of a relatively noncorrosive metal, preferably stainless steel.

It will be noted that the two base portions 12 and 14 each extend in two mutually crossed directions so that they are of appreciable area. It will also be noted that the two base portions lie approximately in a common plane, and that the raised bridge 16 extends generally parallel to the approximately common plane of the base portions.

One of the bases, in this case the upper base 12, is provided with a hook 24 for supporting a valve for the tube. The lower base 14 is conveniently made in the form of a closed loop which is generally rectangular in form, the wire terminating at an end 26. The upper base is an open loop, the free end of the wire being bent outwardly and upwardly to form the hook 24. The top arm 28 of the upper base is preferably prolonged in order to bring the hook 24 to an offset position. The top bar 28 may be straight, but is preferably given a slight convexity, indicated at 30 in Fig. 2, in order to better conform to the curvature of the body.

Figure 3:
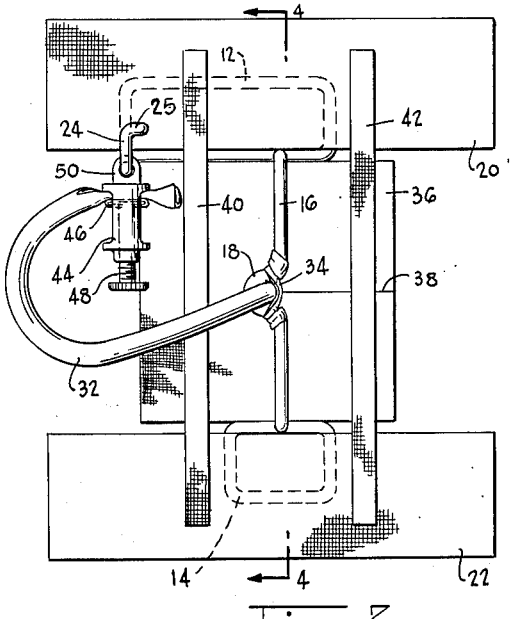
Fig. 3 is a front elevation showing a holder in use on the body of a patient, said holder being a slight modification of that shown in Fig. 1.
Figure 4:
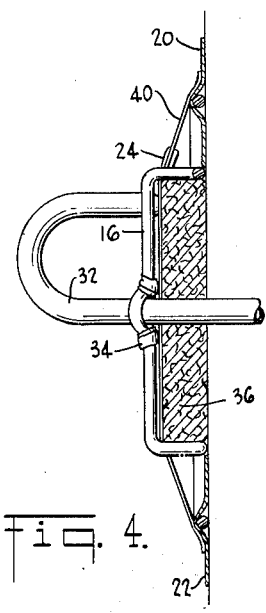
Fig. 4 is a section taken approximately in the plane of the line 4—4 of Fig. 3.

Referring now to Figs. 3 and 4, the holder is placed on the body with the yoke 18 in substantial registration with the tube 32 projecting from the body. The bridge 16 is preferably upright when the patient is upright, and the tapes 20 and 22 are applied over the bases and adhered to the body with the tapes extending in horizontal direction. However, it will be understood that actually the patient is preferably lying at the time the holder is applied. The rubber tube 32 is secured to the raised bridge 16 in any suitable manner. Thread may be employed for this purpose, but I prefer and recommend the use of a thin strip of adhesive tape indicated at 34, this tape being passed around the tube and around the bridge in suitable fashion. The tape has the advantage that it adheres directly to the rubber of the tube and also to the bridge, thus anchoring the tube securely against longitudinal movement as well as lateral movement. It is an easy matter to twist the tape in desired convolutions around the bridge and around the tube because of the raised position of the bridge, that is, it is well spaced from the body of the patient. This spacing is preferably made in a range from ½" to ¾".

A pad of absorbent dressing is indicated at 36. This may be a small standard pad, say 2" square, and for this purpose the bridge 16 of the holder is preferably 2" in length. A single slit 38 is cut across the dressing for half its length. The dressing is then slid around the rubber tube 32 and beneath the bridge 16. In the particular case shown the dressing is slid from left to right and is then anchored in place by means of two narrow strips of tape 40 and 42. The center portions adhere to the dressing, while the end portions adhere to the main or permanent tapes 20 and 22.

It will be seen that the dressing is readily changed from day to day or as often as desired, it being necessary merely to remove the narrow tapes 40 and 42 from the tapes 20 and 22, and to slide the dressing from beneath the bridge, whereupon a new dressing is added, and narrow tapes again are applied. The main tapes 20 and 22 remain on the body, and there is no pain or discomfort to the patient in removing the narrow tapes 40 and 42 because they are not applied directly to the skin.

The end of the tube 32 is closed by means of a valve of the screw clamp type. The construction of the valve will be clear from simultaneous examination of Figs. 3 and 10 in which it will be seen that the valve comprises a body 44 slotted to receive the tube, a compression plate 46 movable in the body 44, a screw 48 passing through and threadedly received in the lower end of the body to raise or lower the plate 46, and an apertured ear 50 at the top of the body, said ear being received over the hook. The valve is preferably made of non-corrosive metal, for example, stainless steel or brass.

In Fig. 3 the hook differs slightly from that shown in Figs. 1 and 2 in having an extra part 25 bent sideward at the tip, thus additionally preventing accidental escape of the valve from the hook. The part 25 is a refinement which is not essential, but one which I consider desirable.

It will be evident that with the arrangement shown, the tube is securely anchored and protected; the dressing is small and neat and securely anchored in place; the valve is very small, light in weight, and safely anchored in position; and the dressing is readily changed without releasing the secure anchorage of the tube.

I have so far described a preferred form of my invention which is to be used with ambulatory patients, or those already out of the hospital, for it should be understood that in some surgical procedures the patient may have to use a tube of this character for months or years. The incision is ordinarily a generally upright or vertical incision, and the tube is usually located at the upper end of the incision. In the arrangement shown in Figs. 1 through 4 the incision is presumed to be already healed, and there is no difficulties in placing the lower tape 22 across the healed incision.

Figure 5:
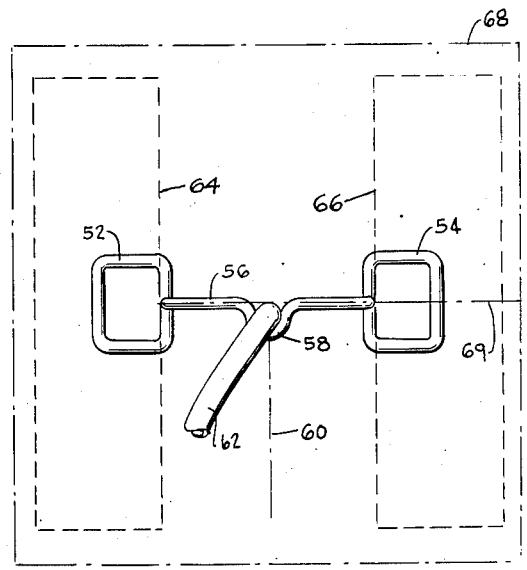
Fig. 5 is a front elevation explanatory of a modification.

Fig. 5 shows a modified holder which may be employed immediately after the operation and while the patient is still confined in bed. In such case there is usually no need for a valve and hook, the tube commonly draining into a bottle or other container. The holder is accordingly made symmetrical, the bases 52 and 54 being alike. They are connected and spaced apart by a raised bridge 56 which is the same as the bridge 16 previously described and which is preferably similarly provided with a yoke 58. As before, the holder is preferably bent up out of a single piece of wire preferably made of stainless steel, and the bases may be closed loops which are preferably rectangular in configuration. The yoke 58 is disposed over the upper end of the incision, schematically represented at 60, and therefore over the point of entry of the tube 60. The bridge 56 is horizontal rather than vertical, and the bases 52 and 54 are taped to the body by means of two vertical tapes 64 and 66. The incision 60 is thus left exposed for the application of suitable surgical dressing. A narrow dressing may be inserted under the bridge, but more likely at this stage of recovery a large area dressing would be applied, somewhat as indicated by the broken line outline 68, the said dressing being horizontally slit at 69 to clear the tube 62 and also the two upright legs supporting the bridge 56. The dressing is held in position in any desired fashion, as by the use of tie cords extending between widely spaced tapes, not shown, as has been done in the past. It will be understood that when the incision 60 heals and the patient becomes ambulatory the tapes 64 and 66 and the holder are removed and are replaced by a vertical holder with horizontal tapes, as was described in connection with Figs. 1 through 4.

Fig. 6 illustrates a holder similar to that shown in Fig. 5 but showing a difference in size. As before, the holder comprises a raised bridge 70 supported by spaced bases 72 and 74, the bridge 70 preferably being reversely bent to provide a yoke 76. In this case the spacing between the bases is approximately twice that shown in Fig. 5, and the yoke 76 is bent on a much larger radius. The change in the yoke is intended to accommodate a large diameter tube 78, in contrast with the small diameter tube previously shown. In this case the holder is again secured in place by means of vertical tapes shown at 80 and 82. The dressing is indicated in broken outline at 84 and 86. Here again a single dressing may be slit to accommodate the holder and tube, or, as a variant here shown, two pieces of dressing are employed, one piece 84 above the holder, and the other piece 86 below the holder, these being pressed together in edge-to-edge relation around the tube. The lower piece covers the incision, schematically represented at 88. The dressing may be held by conventional tie cords, or in any other manner desired.

Still another form of holder which may be used while the patient is still in bed immediately after an operation is shown in Figs. 7 and 8 of the drawing. In this case the base is a large open rectangle made up of three sides 94, 96 and 98. The bridge 100 is again a raised bridge, preferably bent to form a yoke 102. The ends of the bridge are supported by perpendicular legs or supports 104 best shown in Fig. 8. The holder is placed with the yoke 102 over the upper end of the incision, which is schematically shown at 106 in Fig. 7, or in any case over the point of entry of the tube 108. The base of the holder is located above the incision and is held on the body by means of a band 110 of adhesive tape which extends in horizontal direction and is located above the tube and the incision. Dressing is indicated in broken lines, and may consist of either a single piece which is horizontally slit to straddle the tube and holder, or two pieces 112 and 114 pushed in edge-to-edge relation around the tube. The dressing may be held in position by means of conventional tie cords, or by means of small pieces of adhesive tape.

I have described the holders of Figs. 5, 6, 7, and 8 as being used in the period immediately following the operation. However, when the holder is used to hold a wick, in contradistinction to a tube, or when the holder is used to hold a tube which does not require a valve, and therefore does not need a hook for retaining a valve, the said holders, and particularly the simple type shown in Figs. 5 and 6, may be used on ambulatory patients and patients out of the hospital. In such case, however, the holder is preferably disposed with the bridge vertical and the tapes horizontal, as was described in connection with Fig. 3.

Figure 9:
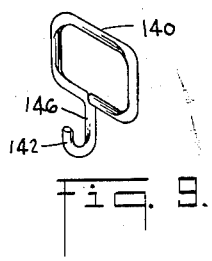
Fig. 9 shows a holder or hook for the valve which may be employed when the valve is to be remote from the incision.

In certain cases such a holder may be preferred even when the patient is provided with a tube having a valve. I refer to cases in which it is more convenient to locate the valve remotely from the incision. For example, when the incision is on the side or toward the rear of the body of the patient it may be more convenient to locate the valve at the front of the body where it is readily accessible. In such case the hook for the valve is preferably separated from the holder, and a suitable hook for this purpose is shown in Fig. 9 of the drawing. Referring to that figure, the holder comprises a base 140 adapted to be taped to the body. It has a hook 142 fixed on the base, the said hook being suitably dimensioned to receive the apertured ear of the valve. Here again the holder is preferably made by bending a single piece of wire, preferably stainless steel. The base 140 is a closed loop which is generally rectangular in outline. One end of the wire is bent downwardly, outwardly and upwardly to form the hook 142.

The manner in which this separated hook may be applied to a patient is illustrated in Fig. 10 of the drawing in which it will be seen that the tube 144 enters the body at a point on one side near the back, while the valve is supported on a holder 146 taped to the body at the front by means of a piece of tape 148. The tube 144 is anchored by means of a holder 150 which is the same as the holder described in connection with Fig. 5 of the drawing. In this case, however, the bridge of the holder is disposed vertically, and the bases are secured to the body by means of horizontal tapes 152 and 154. The patient is an ambulatory patient, and because the incision is healed, the lower tape 154 may be spread across the incision. The absorbent dressing 156 may be quite small, say 2″ square or less, and is slid beneath the holder and around the tube, part of the dressing being slit at 158 as previously described. The dressing is held in position by narrow strips of tape 160 and 162, the ends of which are secured to the main tapes 152 and 154 and not to the body of the patient.

Another modified form of holder is illustrated in Figs. 11 and 12 of the drawing. This holder differs in two main respects, one being that it is fabricated out of sheet metal instead of wire, and the other being the provision of hooks for rubber bands which hold the removable dressing in place. Referring to the drawing, the holder comprises a raised bridge 120 supported by spaced bases 122 and 124. The bridge may be bent at 126 to provide a yoke for better locating the tube. The upper sheet metal base 122 is provided with upwardly bent hooks 128, and the lower sheet metal base 124 is provided with downwardly bent hooks 130. Ordinary rubber bands of appropriate dimension are stretched tautly between the hooks, as indicated at 132, the said bands bearing against the dressing 134, which may as before be a standard dressing of small size, preferably 2" square. It will be seen that to change the dressing is a comparatively simple matter, the rubber bands 132 being unhooked; the old dressing removed; a new dressing slid into place; and the rubber bands being replaced over the new dressing.

The sheet metal bases 122 and 124 are preferably flat, with smooth edges. The bridge 120 and the arms 136 supporting the same are preferably channeled in order to stiffen and strengthen the structure. The edges may be bent or flanged inward as shown, thus leaving the outside of the bridge smooth for better sliding contact with clothing. The hooks 128 and 130 need not be channeled for strength, although such channeling does make them stronger or more rigid. They are preferably channeled as shown in order to present a rounded surface to the rubber bands. For this purpose the metal at the bends of the upper hooks 28 is preferably channeled downward, and the metal at the bends of the lower hooks 30 is preferably channeled upward, the metal at the free ends of all the hooks being channeled outward. It will be understood that the holder is taped on the body by means of bands 138 of adhesive tape, substantially as previously described.

The description has so far referred to the holding of a surgical tube, but it will be understood that the holder is also valuable to securely anchor in place a surgical drain. These are of varied type and some of the arrangements are schematically indicated in Figs. 13 through 16. Fig. 13 shows how a rubber dam type of drain 164 may be used with my holder, a part of the bridge of which is indicated at 166. The tape or thread for securing the drain to the bridge is omitted. Fig. 14 shows how a gauze drain 168 may be used with my holder, a fragment of the bridge being indicated at 170. Fig. 15 shows how a so-called "cigarette drain" 172 may be used with my holder, a portion of the bridge of which is shown at 174. The cigarette drain is a combination of rubber dam and gauze. Fig. 16 shows how both a tube 176 and a drain 178 may be used with my holder, a part of the bridge being indicated at 180. This may be done immediately after an operation and until the incision heals. Later the drain is removed, leaving only the tube. In all of Figs. 13 through 16 I have omitted the means actually securing the drain to the bridge in order to simplify the drawing. It will be understood, however, that this means is preferably a narrow strand of adhesive tape which is turned about the drain and about the bridge in suitable convolutions, much as was described and shown in Figs. 3, 4, 9 and 11. It will also be recalled that it is a fairly easy and convenient matter to thus wind the tape around the bridge and drain because of the elevated position of the bridge, affording adequate finger space between the bridge and the body.

The valve shown in Figs. 3 and 10 is made of metal. The body of the valve may also be made of a suitable plastic. I prefer the use of metal because of its greater strength and the fact that it may therefore be made very small and compact. Metal is cold to the touch, but the amount of metal here involved is so small that it quickly warms, and indeed may be sufficiently warmed by the fingers while being hooked in place. However, plastics, in addition to being warm to the touch, are also light in weight. This is unimportant when dealing with the very small valve which I have devised for a small surgical tube. However, in those more unusual cases requiring a large diameter tube, the appropriate valve may become appreciable in weight, and in such cases there may be some preference for the use of plastics. A plastic valve is illustrated in Figs. 17, 18 and 19 of the drawing in which it will be seen that the valve comprises a generally rectangular hollow body 182 made of a suitable plastic and having an apertured ear 184 formed at the upper end thereof. A small pressure plate 186, preferably made of metal, is movable within the body of the valve and is preferably carried in the upper end of a suitable clamp screw 188 threadedly received in the lower end of the body. The ear 184 is dimensioned to be received on the hook of the holders previously described.

It is believed that the construction and method of use, as well as the advantages of my improved holder for surgical tubes, drains and valves, will be apparent from the foregoing detailed description thereof. The use of a raised bridge makes it possible to readily insert an absorbent dressing beneath the bridge for day-to-day change. The upward spacing of the bridge separates the metal of the holder from the opening in the body, and so reduces the possibility of contamination, and the occurrence of pain. The raised bridge facilitates the operation of attaching the tube or dressing to the bridge, because the thread or adhesive tape may be wound in different directions around the bridge and the tube. The arrangement makes it possible to use a small dressing which is neat in appearance. The dressing may be held by tapes, thus guarding against shifting or loss, but the tapes are not applied to the skin, and there is not pain attendant on the daily removal of the tapes for change of dressing. Rubber bands may be used conveniently, and are adequate, there being little tendency to move the dressing because it is shielded from clothing by the bridge thereover. The valve is small, light in weight, and is securely held in position, with no appreciable inconvenience to the patient, and no danger of movement of the valve caused by accidental pull by clothing or the like resulting in displacement of the tube at the incision.

In the case of the ambulatory patient there is the advantage that the holder is held by horizontal tapes. Vertical tapes are a great inconvenience, for they "draw" when the patient stands erect, and wrinkle when the patient bends, with great discomfort to the patient in either case. This is avoided when using horizontal tapes. The fitting itself does not limit bending or bodily motion. With an ordinary downward bend the upper base seems to retain its place on the body, and the lower base, together with the flesh to which it is taped, seems to slide or roll freely over the immediately subjacent flesh. Bodily folds take place, but they take place outside the holder and not in the area protected by the holder itself.

Indeed the stiffness of the holder provides a very important advantage because it maintains a uniform spacing and condition of the flesh beneath the bridge of the holder or, in other words, in the area between the upper and lower bases. Despite bending and activity there is neither an outward bulging nor a stretch or pull at the point of entry of the tube through the body. Whatever tautness or relaxation of the body exists in this area at the time the holder is applied to the body is thereafter maintained. For this reason the holder is preferably taped to the body with the patient lying flat on bed, for this keeps the body at the incision and tube in that condition in which it will be most comfortable most of the time. It is then found to be comfortable whether the patient is lying or standing erect, and in any event the holder guards the incision and the tube against the stresses which would otherwise be applied thereto during bending or other bodily activity.

It will be apparent that while I have shown and described the improved holder in a number of different forms, further changes may be made in the structures shown without departing from the scope of the invention, as sought to be defined in the following claims.

I claim:

1. A surgical tube holder adapted to be secured outside the body of a patient following an operation, said holder comprising two spaced base portions connected by a raised bridge, the bridge having a yoke in which the tube may be secured, a small part only of the bridge being reversely bent to form the yoke, said base portions being adapted to be secured against the body by means of adhesive tape.

2. A surgical tube holder adapted to be secured outside the body of a patient following an operation, said holder comprising two spaced base portions connected by a raised bridge, said base portions being adapted to be secured against the body by means of adhesive tape, a small part only of the bridge being reversely bent to form a yoke to receive the tube, and said holder being made of a single piece of wire bent to form the desired bases, bridge, and yoke.

3. A surgical tube and valve holder adapted to be secured outside the body of a patient following an operation, said holder comprising two spaced base portions lying approximately in a common plane and connected by a raised bridge to which the tube may be secured, said bridge extending generally parallel to the plane of the base portions and being long enough to receive a flat pad of surgical dressing therebeneath, said base portions lying outside the ends of the bridge and being adapted to be secured against the body by means of adhesive tape, one of said bases having a hook for supporting a valve for the tube.

4. A surgical tube and valve holder adapted to be secured outside the body of a patient following an operation, said holder comprising two spaced base portions connected by a raised bridge to which the tube may be secured, and beneath which a flat pad of surgical dressing may be slid, said base portions lying outside the ends of the bridge and being adapted to be secured against the body by means of adhesive tape, said holder being made of a single piece of wire bent to form the desired bases and bridge, one of said bases being a loop, and the other of said bases having one end of the wire bent to form a hook for supporting a valve for the tube.

5. A surgical tube and valve holder adapted to be secured outside the body of a patient following an operation, said holder comprising spaced upper and lower base portions connected by a raised bridge, said base portions being adapted to be secured against the body by means of adhesive tape, the bridge having a yoke to receive the tube, said holder being made of a single piece of wire bent to form the desired bases, bridge, and yoke, the lower base being a closed loop generally rectangular in form, and the upper base being an open loop generally rectangular in form with one end of the loop bent outwardly and upwardly to form a hook for supporting a valve for the tube.

6. A holder and valve combination adapted to be secured outside the body of a patient for use with a surgical tube following an operation, said valve comprising a body slotted to receive the tube, a compression plate movable in said body, a screw passing through the lower end of the body to move the plate, and an apertured ear at the top of the body, said holder comprising a base and a hook, said base being adapted to be secured against the body by means of adhesive tape, and said hook being fixedly supported by said base, and the ear of said valve being received on the hook of said holder.

7. A surgical tube holder adapted to be secured outside the body of a patient following an operation, said holder comprising two spaced base portions connected by a raised bridge to which the tube may be secured, said base portions being adapted to be secured against the body by means of adhesive tape, the bases having hooks adapted to receive elastic bands which may be stretched taut between the bases on each side of the bridge to hold a piece of absorbent dressing in place around the tube beneath the bridge.

8. A surgical tube holder adapted to be secured outside the body of a patient following an operation, said holder comprising two spaced base portions connected by a raised bridge to which the tube may be secured, said base portions being adapted to be secured against the body by means of adhesive tape, said holder being made of a single piece of sheet metal shaped to desired configuration, the raised bridge portion being channeled to stiffen the same.

9. A surgical tube holder adapted to be secured outside the body of a patient following an operation, said holder comprising two spaced base portions connected by a raised bridge to which the tube may be secured, said base portions being adapted to be secured against the body by means of adhesive tape, the bridge having a yoke to receive the tube, said holder being made of a single piece of sheet metal shaped to desired configuration.

10. A surgical tube holder adapted to be secured outside the body of a patient following an operation, said holder comprising two spaced base portions connected by a raised bridge to which the tube may be secured, said base portions being adapted to be secured against the body by means of adhesive tape, said holder being made of a single piece of sheet metal shaped to desired configuration, the inner edges of the bases having hooks adapted to receive elastic bands which may be stretched taut between the bases on each side of the bridge to hold a piece of absorbent dressing in place around the tube beneath the bridge.

11. A surgical tube and valve holder adapted to be secured outside of the body of a patient following an operation, said holder comprising two spaced base portions lying approximately in a common plane and connected by a raised bridge to which the tube may be secured, said bridge extending generally parallel to the plane of the base portions and being long enough to receive a flat pad of surgical dressing therebeneath, and a support projection also connected to and supported by said base portions for receiving and supporting a valve for the tube, said base portions lying outside the ends of the bridge and being adapted to be secured against the outside surface of the body.

12. A surgical tube holder adapted to be secured outside the body of a patient following an operation, said holder comprising two spaced flat base portions each extending in two mutually crossed directions, said base portions lying approximately in a common plane and being connected by a raised bridge to which the tube may be secured, said bridge extending generally parallel to the approximately common plane of the base portions and being long enough to receive a flat pad of surgical dressing therebeneath between said base portions, said base portions lying outside the ends of the bridge and being adapted to be secured flat against the surface of the body of the patient by means of adhesive tape.

13. A surgical tube holder adapted to be secured outside the body of a patient following an operation, said holder comprising two spaced flat base portions each extending in two mutually crossed directions, said base portions lying approximately in a common plane and being connected by a raised bridge to which the tube may be secured, said bridge extending generally parallel to the approximately common plane of the base portions and being long enough to receive a flat pad of surgical dressing therebeneath between said base portions, said base portions lying outside the ends of the bridge and being adapted to be secured flat against the surface of the body of the patient by means of adhesive tape, said holder being made of a single piece of wire bent to form the desired bases and bridge, and a small part only of the bridge being reversely bent to form a yoke to receive the tube.

14. A surgical tube holder adapted to be secured outside the body of a patient following an operation, said holder comprising a base portion lying approximately in a plane and adapted to be secured against the body by means of adhesive tape, and a bridge extending generally parallel to the plane of the base portion and somewhat raised above the plane of the base portion and there fixedly supported by the base portion, the bridge having a yoke in which the tube may be secured, a small part only of the bridge being reversely bent to form the yoke.

15. A surgical tube holder adapted to be secured outside the body of a patient following an operation, said holder comprising a base portion lying approximately in a plane and adapted to be secured against the body by means of adhesive tape, and a bridge extending generally parallel to the plane of the base portion and somewhat raised above the plane of the base portion and there fixedly supported by the base portion, a small part only of the bridge being reversely bent to form a yoke to receive the tube, and said holder being made of a single piece of wire bent to form the desired base, bridge and yoke.

16. A surgical tube and valve holder for use on a patient following an operation, said holder comprising two spaced base portions lying approximately in a common plane and connected by a raised bridge to which the tube may be secured, a small part only of said bridge being reversely bent to form a yoke to receive the tube, said bridge extending generally parallel to the plane of the base portions and being long enough to receive a flat pad of surgical dressing therebeneath, said base portions lying outside the ends of the bridge and being adapted to be secured against the outside of the body of the patient, and a support projection also connected to and supported by a base portion for detachably receiving and supporting a valve for the tube.

17. A surgical tube and valve holder adapted to be secured outside the body of a patient following an operation, said holder comprising two spaced base portions lying approximately in a common plane and connected by a raised bridge to which the tube may be secured, said bridge extending generally parallel to the plane of the base portions and being long enough to receive a flat pad of surgical dressing therebeneath, said base portions lying outside the ends of the bridge and being adapted to be secured against the body by means of adhesive tape, one of said bases having a hook for supporting a valve for the tube, the free end of said hook being bent transversely of the plane of the hook to help prevent unintended escape of the valve from the hook.

18. A holder and valve combination adapted to be secured outside the body of a patient for use with a surgical tube following an operation, said valve comprising a body slotted to receive the tube, a compression plate movable in said body, a screw passing through the lower end of the body to move the plate, and an apertured ear at the top of the body, said holder comprising a base and a hook, said base being adapted to be secured against the body by means of adhesive tape, and said hook being fixedly supported by said base, and the ear of said valve being received on the hook of said holder, the free end of said hook being bent transversely of the plane of the hook to help prevent unintended escape of the valve from the hook.

MORRIS SOLOMON.

REFERENCES CITED

The following references are of record in the file of this patent:

UNITED STATES PATENTS

| Number | Name | Date |
| --- | --- | --- |
| 698,571 | Smith | Apr. 29, 1902 |
| 765,793 | Ruckel | July 26, 1904 |
| 2,152,922 | Robinson | Apr. 4, 1939 |
| 2,508,707 | Davis | May 23, 1950 |

FOREIGN PATENTS

| Number | Country | Date |
| --- | --- | --- |
| 51,858 | Norway | Dec. 19, 1932 |